United States Patent [19]
Saulpaugh et al.

[11] Patent Number: 5,968,136
[45] Date of Patent: Oct. 19, 1999

[54] APPARATUS AND METHOD FOR SECURE DEVICE ADDRESSING

[75] Inventors: Thomas Saulpaugh, San Jose; David E. Bohman, II, San Francisco, both of Calif.

[73] Assignee: Sun Microsystems, Inc., Mountain View, Calif.

[21] Appl. No.: 08/869,659

[22] Filed: Jun. 5, 1997

[51] Int. Cl.$^6$ .................................................. G06F 13/00
[52] U.S. Cl. .................................. 710/3; 710/6; 710/36; 710/48; 710/52; 709/300; 713/200; 395/701; 395/712; 380/4; 380/25
[58] Field of Search ........................... 364/200; 395/823, 395/800, 275, 325, 712, 701; 710/1, 2, 3, 6, 36, 48, 52; 709/300; 380/4, 25; 713/200

[56] References Cited

U.S. PATENT DOCUMENTS

| | | | |
|---|---|---|---|
| 4,173,783 | 11/1979 | Couleur et al. | 364/200 |
| 4,533,996 | 8/1985 | Hartung et al. | 364/200 |
| 4,814,977 | 3/1989 | Buonomo et al. | 364/200 |
| 4,868,738 | 9/1989 | Kish et al. | 364/200 |
| 5,014,194 | 5/1991 | Itoh | 364/200 |
| 5,353,411 | 10/1994 | Nakaosa et al. | 395/275 |
| 5,371,860 | 12/1994 | Mura et al. | 395/325 |
| 5,623,697 | 4/1997 | Bland et al. | 710/22 |
| 5,628,023 | 5/1997 | Bryant et al. | 395/800 |
| 5,640,591 | 6/1997 | Rosenthal et al. | 710/3 |
| 5,724,425 | 3/1998 | Chang et al. | 380/25 |

OTHER PUBLICATIONS

"The Smalltalk–80 Virtual Machine", Glenn Krasner, BYTE Publications, Inc., Aug. 1991, pp. 300–320.

Fifth Annual ACM Symposium On Principles Of Programming Languages, pp. iii, & 1–8, Jan. 23–25, 1978, Tucson, Arizona.

apl79 Conference Proceedings "Association for Computing Machinery", pp. 82–87, May 30–Jun. 1, 1979, Rochester, New York.

"Welcome to the Open Firmware Home Page", URL http//www.firmworks.com, Dec. 23, 1996, 7 pp.

"What is Open Firmware?", URL http://www.firmworks.com, Oct. 3, 1996, 6 pp.

*Primary Examiner*—Joseph E. Palys
*Assistant Examiner*—Abu Hossain
*Attorney, Agent, or Firm*—Blakely Sokoloff Taylor & Zafman

[57] ABSTRACT

A method for securely accessing a peripheral device at an absolute address is disclosed. A computer program is executed to request from an operating system a memory access object including a procedure executable to address the peripheral device at the absolute address. An operating system procedure is executed to provide the memory access object to the computer program if a value associated with the computer program indicates that the computer program is trusted to perform absolute addressing. If the operating system procedure provides the memory access object to the computer program, the computer program is executed invoke the memory access object procedure to address the peripheral device at the absolute address.

21 Claims, 7 Drawing Sheets

APPARATUS AND METHOD FOR SECURE DEVICE ADDRESSING

BACKGROUND OF THE INVENTION

(1) Field of the Invention

The present invention relates to the field of computer programming. More specifically, the present invention relates to a method for providing secure input/output (I/O) device addressing.

(2) Art Background

Virtually all modern operating systems support the notion of a user-installable device driver. A device driver is a computer program that provides an operating system (OS) with a well-defined set of services to control the operation of a specific computer hardware component. The act of installing a device driver generally involves loading the device driver into system memory and recording the location of the device driver in an OS-maintained data structure. Once installed, the device driver operates as an extension of the OS. When an application program requests the OS to perform device I/O, the operating system identifies the device driver responsible for the subject device and requests service via the OS/device driver interface.

In order for a device driver to perform device control, the device driver must be able to access locations in the computer system's I/O space, where device registers and device buffers are mapped. These locations are called absolute addresses. The need to access absolute addresses presents several difficulties. First, if device driver access to the computer system's I/O space is not sufficiently restricted, the computer system becomes more vulnerable to being corrupted or crashed by buggy device driver code. This presents a major impediment to the ability to download remote code for execution. At present, a "sandbox" model is typically employed to prevent remote code from addressing critical memory regions such as the I/O space. In the sandbox model, code is verified instruction by instruction to ensure that memory access outside a specified memory range does not occur. Unfortunately, the sandbox model significantly restricts the types of programs that can securely be downloaded for execution. Further, the sandbox model does not address security issues of locally resident application programs.

A second problem with I/O space addressing from device drivers is that some modern computer programming languages, most notably the Java™ programming language developed by Sun™ Microsystems of Mountain View, Calif., do not support the sort of peek and poke operations necessary to read and write absolute memory locations in the I/O space. Java and Sun are trademarks of Sun Microsystems, Inc. Consequently, though they might want to, programmers cannot presently implement device drivers that must read and write absolute memory locations in such programming languages.

Yet another problem caused by I/O space addressing from device drivers is reduced portability. The manner in which I/O space is addressed changes from hardware platform to hardware platform. As a result, a different device driver is usually required for each different hardware platform to which a device might be coupled. This complicates matters not only for device driver programmers, but also for systems administrators and on-line device driver providers. Instead of being able to make one device driver available for download and installation, systems administrators and on-line providers must provide as many device drivers as there are hardware nuances affecting device driver code.

It would be desirable therefore, to provide a method for limiting access to a computer system's I/O space to secure, trusted programs and then to the precise range of I/O space necessary for a given secure, trusted program to perform its intended function. Further, it would be desirable to provide a method for accessing the I/O space from a program written in a programming language having no facility for asserting an absolute address in the I/O space. It would also be desirable to provide a method for accessing I/O space in a way that allows the accessing program to be easily ported between different hardware platforms.

BRIEF SUMMARY OF THE INVENTION

A method for securely addressing a peripheral device at an absolute address is disclosed. A computer program such as a device driver or bus manager is executed to request a memory access object from an operating system. The memory access object includes a procedure executable to address the peripheral device at the absolute address. The operating system provides the memory access object to the computer program if a value associated with the computer program indicates that the computer program is trusted to perform absolute addressing. If the operating system provides the memory access object to the computer program, the computer program invokes the procedure included in the memory access object to address the peripheral device at the absolute address.

BRIEF DESCRIPTION OF THE DRAWING

The present invention is illustrated by way of example and not limitation in the figures of the accompanying drawing in which like references indicate similar elements and in which.

DETAILED DESCRIPTION

A method for secure device addressing is described below. Although numerous specific details are set forth in order to provide a thorough understanding of the present invention, it will be apparent to one of ordinary skill in the art that the present invention may be practiced without such specific details. For example, much of the following discussion is focused on I/O space addressing at the direction of a program written in the Java programming language. It will be readily appreciated, however, that the present invention may be used to address I/O space from a program written in other programming languages.

Traditional Device Driver Model

Figure 1:
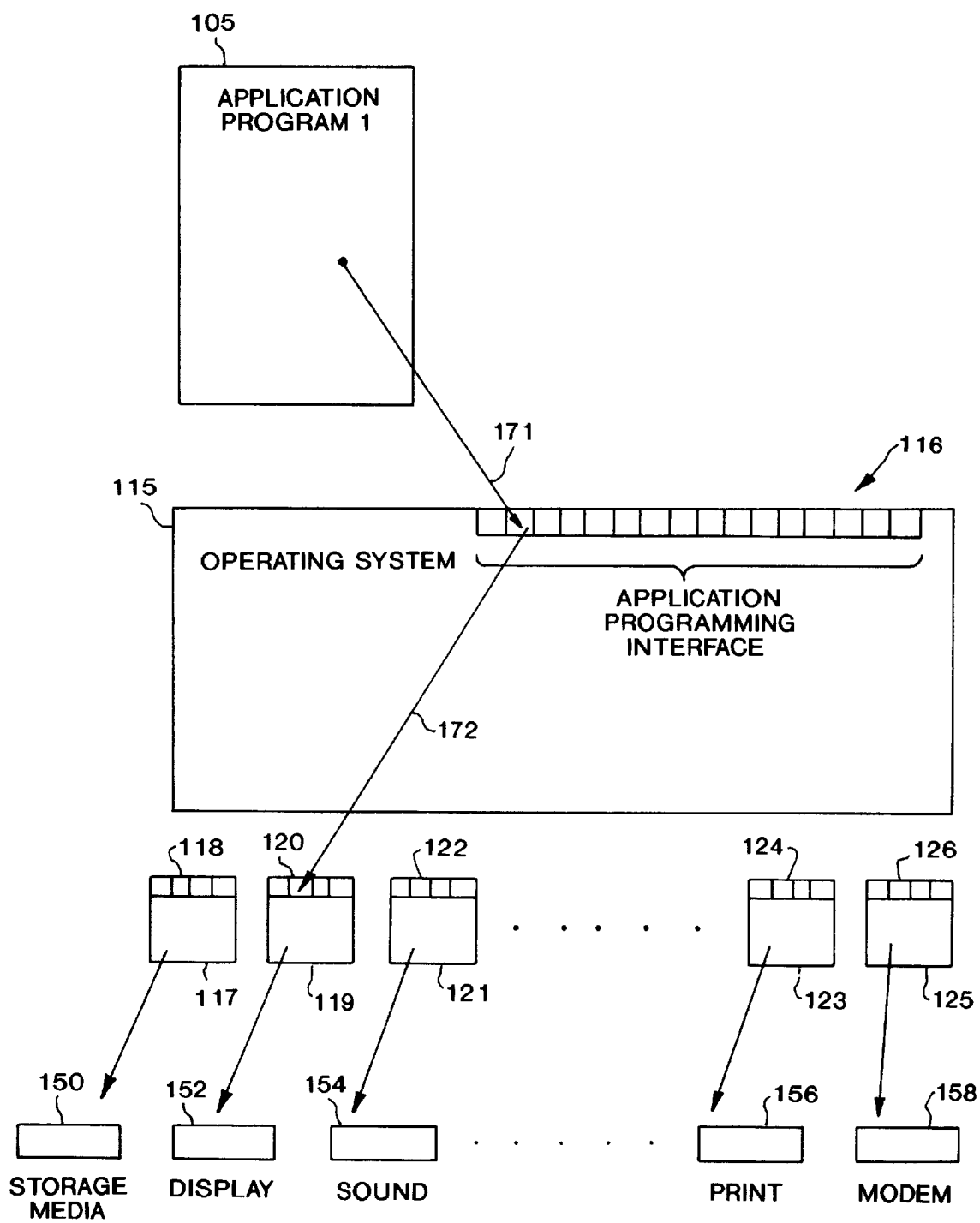
FIG. 1 illustrates a traditional device driver model.

FIG. 1 illustrates the manner in which device control is performed in a traditional device driver model. Application program 105, operating system 115 and device drivers 117, 119, 121, 123 and 125 are all loaded into computer system memory. As discussed below in reference to FIG. 6, the expression "system memory" refers to general purpose random-access memory (RAM) from which instructions are read in a processor fetch and execute cycle and into which operating system 115 code and application program 105 is loaded for execution.

Operating system 115 includes a set of services 116 that can be invoked by application programs to perform various operating system functions. Herein, the expression "operating system" refers to program code executed to manage hardware resources on behalf of application programs and includes stand-alone virtual machines and operating-system-mounted virtual machines that are used to provide services to application programs.

The set of services 116 is referred to as an "application programming interface" (API) and includes a number of services devoted to device control. Similarly, each device driver 117, 119, 121, 123 and 125 implements a set of device driver services 118, 120, 122, 124 and 126 that can be invoked by operating system 115 to control the attached devices 150, 152, 154, 156 and 158. Each set of device driver services (118, 120, 122, 124 and 126) defines a standard device driver interface, no matter how different the attached hardware devices may be from one another.

If, during execution of application program 105, an instruction requesting device I/O is executed, a service in API 116 is invoked by procedure call, process activation or software interrupt to carry out the requested operation. This is indicated in FIG. 1 by arrow 171. As an aside, a procedure call is typically referred to as a "method call" in an object-oriented context. Herein, a procedure may be a method, function, subroutine or any other sequence of instructions which ends in a return to a caller.

As discussed above, operating system 115 does not include device control code for each of the attached devices and instead maintains a data structure identifying device drivers for that purpose. The operating system 115 determines the device driver corresponding to the device control request, indicated by way of example in FIG. 1 to be device driver 119, then invokes device driver 119 by making a call (indicated by arrow 172) to a service provided through device driver interface 120. After being invoked by call 172, device driver 119 may absolutely address registers or data buffers in hardware device 152 directly, or indirectly through another layer of software that provides basic I/O services (BIOS) for fundamental computer components such as display, keyboard and storage media.

In the traditional device driver model of FIG. 1, device driver code (117, 119, 121, 123, 125) is tightly bound to the controlled hardware device (150, 152, 154, 156, 158) and the device driver must be able to address absolute addresses in the system I/O space where the controlled device's registers and data buffers are mapped. Herein, the expression "I/O space" refers to the set of processor addressable locations not already mapped to system memory and includes both memory-mapped locations and I/O port mapped locations. As stated below, system memory may be addressed by either physical or virtual addressing schemes.

It is important to distinguish between addressing I/O space and addressing system memory. Addresses in I/O space are determined by the physical connection of hardware devices to a computer system's address buses. Therefore, unlike program variables or dynamically allocated storage having addresses in system memory, I/O space addresses cannot be remapped (unless, of course, hardware is reconfigured). For example, a program variable used to store data before it is written to a control register could be mapped to a different address in system memory each time the program defining the variable is loaded into system memory by the operating system. By contrast, the control register itself is mapped to a particular address determined by a physical connection to an address bus and must always be addressed at the particular address. For this reason, I/O space addresses are said to be "absolutely mapped" and a computer program which writes or reads an absolutely mapped address is said to perform "absolute addressing".

Most popular programming languages provide a facility to perform absolute addressing. In the BASIC (Beginner's All-purpose Symbolic Instruction Code) programming language, PEEK and POKE operators are provided for reading and writing memory at locations offset from a program-specified base address. IN and OUT instructions are provided for performing analogous operations in an I/O port address space. In the C and C++ programming languages, absolute addressing is as simple as assigning a pointer to point to a specified address in the I/O space, then de-referencing the pointer to write to or read from the pointed to location.

Although the power to point and write/read anywhere in a computer system's I/O space makes device driver programming possible, it also gives life to some of the more pernicious programming bugs. The C programming language is particularly notorious in this regard. C's pointer model, though powerful and versatile, makes it easy to corrupt and leak memory. Even experienced programmers occasionally index beyond the end of an array, inadvertently corrupting memory contents or causing a system-halting exception. Memory leaks caused by mishandling pointers to dynamically allocated memory can be even worse. Often a memory leak goes unnoticed until the offending code is executed a sufficient number of times to affect system performance. Since test systems tend to have inordinately large amounts of memory and are frequently re-booted, memory leaks often go undetected during software testing and make their way into commercial releases of software products.

The popularity of the Internet and its promise as a software delivery conduit has increased the sensitivity of software vendors to program bugs. The vision of Internet computing is that computer users will increasingly download application code from remote Internet sites and then execute the downloaded code on their own machines. Of course, sites providing code that crashes or corrupts the downloading system are not likely to have repeat visitors.

At roughly the same time the Internet began to come into mainstream use, a new programming language, named Java™, began to gain notoriety. The Java programming language includes several features that make it well suited to Internet programming. First, Java programs tend to be relatively secure and free of bugs. The designers of Java sought to avoid some of the more error-prone features of the C and C++ programming languages and entirely omitted support for pointer data types. Also, Java programs automatically scan for memory allocated to Java arrays and objects that are no longer in use, and reclaim the memory for later allocation. This feature is referred to as "garbage collection" and effectively prevents the sorts of memory leaks that plague C and C++ programs.

Another feature that makes Java a good programming language for the Internet is that Java source code is compiled into a stream of bytes ("Java byte codes") that can be interpreted for execution by just about any hardware platform. By embedding a Java interpreter in an Internet browser, Java byte codes downloaded from Internet sites can be interpreted into machine instructions recognized by the local processor and executed. As a result, small Java application programs (referred to as Java Applets) can be linked to a web page and downloaded automatically by the browser upon reaching the link. The effect is to achieve significantly more interactive and useful web-sites. Since Java interpreters have been written for most of the popular computing platforms, including Windows '95, Macintosh and Sun Solaris, Java byte codes can be executed by the majority of machines browsing the Internet. Windows 95 is a trademark of Microsoft Corporation. Macintosh is a Trademark of Apple Computer. Sun Solaris is a trademark of Sun Microsystems.

Finally, Java is an object-oriented programming (OOP) language. In OOP, computing problems are resolved into data and operations to be performed on data. By combining the data and associated operations (referred to as "methods" in OOP parlance) in a programming construct called an "object", then limiting access to object data to object method calls, the underlying representation of object data and implementation of object methods can be hidden from calling code. From the caller's perspective, the object is a black box having well defined inputs and outputs so that the object's functionality can be exploited without concern for the object's internal workings. This language-enforced modularity is advantageous in any software development requiring more than a few programmers, because it allows natural, well-defined boundaries to be drawn between programming tasks. Also, since the access to data is limited to a handful of identifiable methods, bugs arising from untimely or erroneous data modification are rare and easy to trace. Finally, since most OOP languages, including Java, include facilities for re-using objects and extending their functionality in new objects, OOP naturally encourages re-use of existing code; a major shortcoming of traditional, procedure-oriented programming languages like C, Pascal and BASIC.

Despite its advantages as an Internet programming language, Java is not suited for writing device drivers that function according to the traditional device driver model. As stated above, absolute addressing in system I/O space is not possible in Java. This means that device driver programmers that might otherwise choose to program in Java are forced to use other, less secure programming languages. Of course, the Java programming language could be modified to support absolute addressing, but that would undermine the secure nature of memory access by Java programs, one of Java's primary strengths.

Overview of a Method According to the Present Invention

In the present invention, absolute addressing is performed by way of an object-oriented application programming interface in the operating system. A device driver or other program that must perform absolute addressing requests access to memory access objects maintained by a trusted memory manager. The memory manager provides memory access objects to the device driver or other program, but without activating the methods of the memory access objects. The device driver or other program then requests the memory manager to activate the methods of the memory access objects. The memory manager verifies that a digital signature associated with the device driver or other program indicates that the device driver or other program is sufficiently trusted before activating the methods of the memory access object. Once the memory access object methods have been activated, the device driver or other program is able to perform read and write operations at absolute addresses without ever having direct access to the absolute addresses wrapped in the memory access objects. This allows secure, flexible absolute addressing by programs written in programming languages like Java that have eliminated pointer data types and pointer arithmetic.

Figure 2:
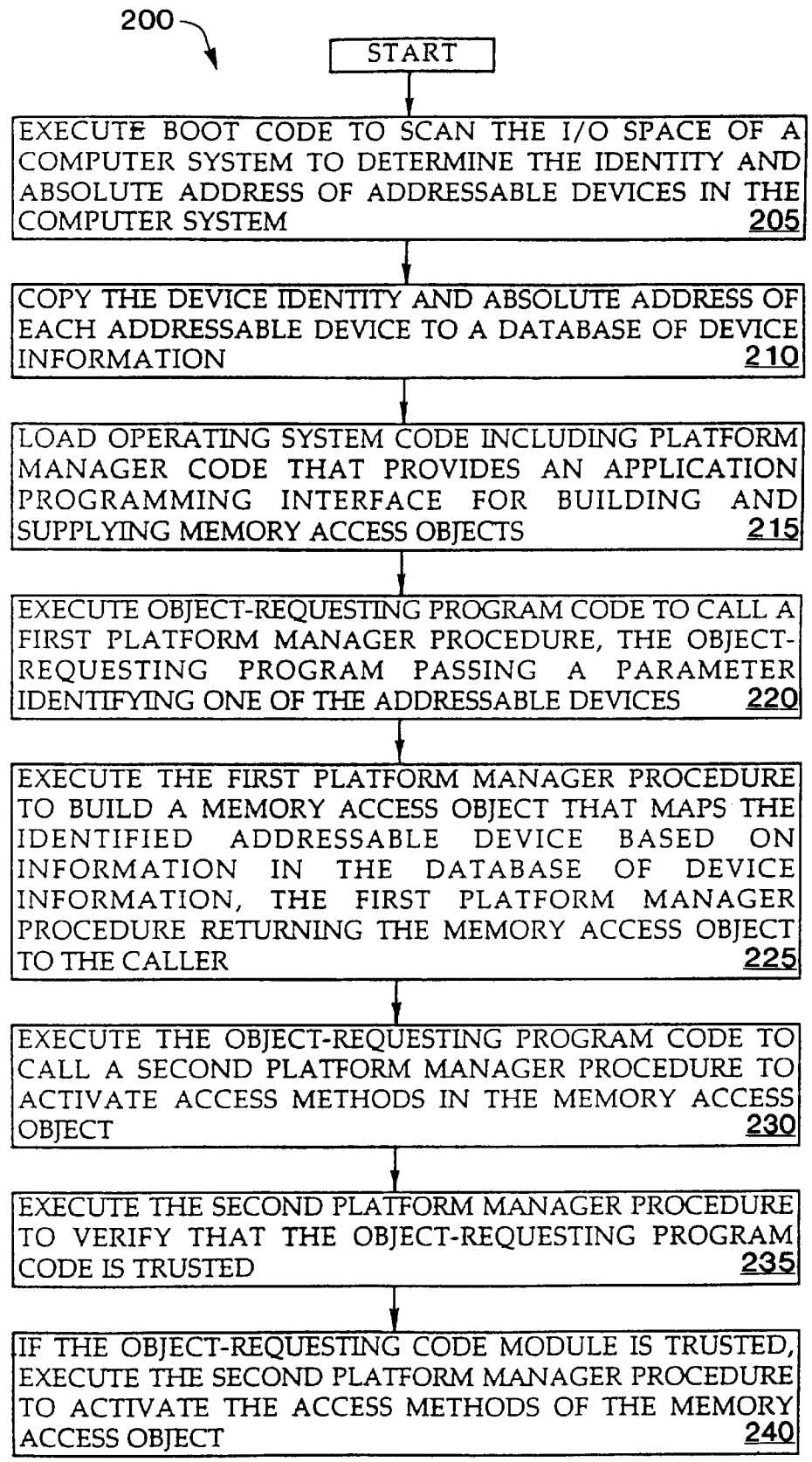
FIG. 2 is a flow diagram of a method according to one embodiment of the present invention.

FIG. 2 is a flow diagram of a method 200 according to one embodiment of the present invention. At step 205, when the computer is powered on, a boot program stored in firmware is executed to scan the I/O space to determine the identity and location of processor-addressable hardware devices attached to the system. At step 210 the device identity and absolute address information obtained in step 205 is used to generate a database of device information. When this operation is performed in compliance with the standard set forth in IEEE 1275-1994, the database of device information describing each of the addressable devices is stored in a well defined data structure known as a "1275 device tree". In alternate embodiments of the present invention, other databases of device information may be used instead of a 1275 device tree.

At step 215, operating system code is loaded into system memory. The operating system code includes code that can be executed to implement a software entity referred to as a "platform manager". The platform manager provides an application programming interface (API) that can be invoked by other operating system code and by code not included in the operating system (e.g., a device driver), to build one or more data objects called "memory access objects" and to supply the memory access objects to the calling code. Program code executed to call methods provided in the platform manager API is referred to in method 200 as "object-requesting" code. Thus, at step 220, object-requesting code such as a bus manager, memory manager or device driver is executed to call a first platform manager procedure that builds and returns a memory access object. The object-requesting code passes a parameter to the first platform manager procedure that can be used by the platform manager to identify absolute address information in the database of device information pertaining to a particular device or set of devices. In one embodiment of the present invention, for example, the object-requesting code passes a device name that can be matched with a device name stored in the 1275 device tree to locate the associated absolute address of the device.

At step 225 of method 200, the first platform manager procedure is executed to build the requested memory access object. In a preferred embodiment of the present invention, the memory access object built in step 225 is defined by a Java programming language construct known as an object class. When the object class is instantiated (instantiation refers to allocating memory space for and initializing a data object based on the object class) a base absolute address and a length defining a range of absolute addresses are copied into private data members of the memory access object and made accessible only by methods included in the memory access object definition. The object methods allowing read and write access to absolute addresses are referred to herein as access methods. By invoking the access methods of a memory access object, a computer program can perform absolute addressing without specifying or even having access to the value of an absolute address. This provides significant benefits. First, the developer of a computer program that must read from or write to an absolute address is able to effectively code the absolute addressing step without having to specify the size, format or value of the absolute address. Without code specifying such details, device drivers and other absolute addressing programs are much less likely to contain erroneous memory access code. Also, without hardware-dependent absolute addressing code, it becomes possible to write device drivers that are portable between different hardware platforms. Further, the need for a wide-open pointer model to accomplish absolute addressing is eliminated. This means that absolute addressing can be performed by programs written in programming languages having no facility for absolute addressing. Also, as will be discussed further below, forcing absolute addressing to be performed through memory access object methods enables software-controlled bounds checking and simplifies debugging of code addressing the system I/O space.

Still referring to method 200 of FIG. 2, at step 225, the platform manager returns the memory access object to the caller. However, according to one embodiment of the present invention, the access methods of the memory access object returned in step 225 are inactivated and therefore cannot initially be invoked to perform absolute addressing. Consequently, at step 230, the object-requesting program code is executed to call a second platform manager procedure to activate the access methods of the memory access object.

At step 235, the second platform manager is executed to verify that the object-requesting code is sufficiently trusted to permit it perform absolute addressing. According to a preferred embodiment of the present invention trust is verified according to at least one of two techniques. First, if the object-requesting code seeking activation of memory access object access methods is included within operating system code trusted with memory access objects, the access methods are activated at step 240. In one embodiment of the present invention, the package facility of the Java programming language is used to partition operating system code trusted with activated memory access objects from operating system code not trusted with activated memory access objects. That is, trusted operating system code is grouped together in a secure Java package.

It will be appreciated that while the above-described embodiment of the present invention includes separate steps for obtaining and activating a memory access object, in an alternate embodiment of the present invention, these steps may be combined. For example, information allowing verification that the object-requesting code module is trusted could be passed to the platform manager procedure in the same call that requests a memory access object. A memory access object will be returned to the object-requesting code only if the verification is successful.

In the other of the two verification techniques, if the object-requesting code is not included within trusted operating system code, as in the case of a device driver or bus manager, the object-requesting code may still be accorded trusted status if it includes a digital signature identifying a certified entity known to the platform manager. The certified entity is made known to the platform manager when a certificate from a digital signature certifying authority is imported into an identity database available to the platform manager. If the object-requesting code includes a digital signature indicating that it has been signed by a certified entity imported into the identity database, the platform manager will activate the memory access object access methods at step 240.

Figure 3:
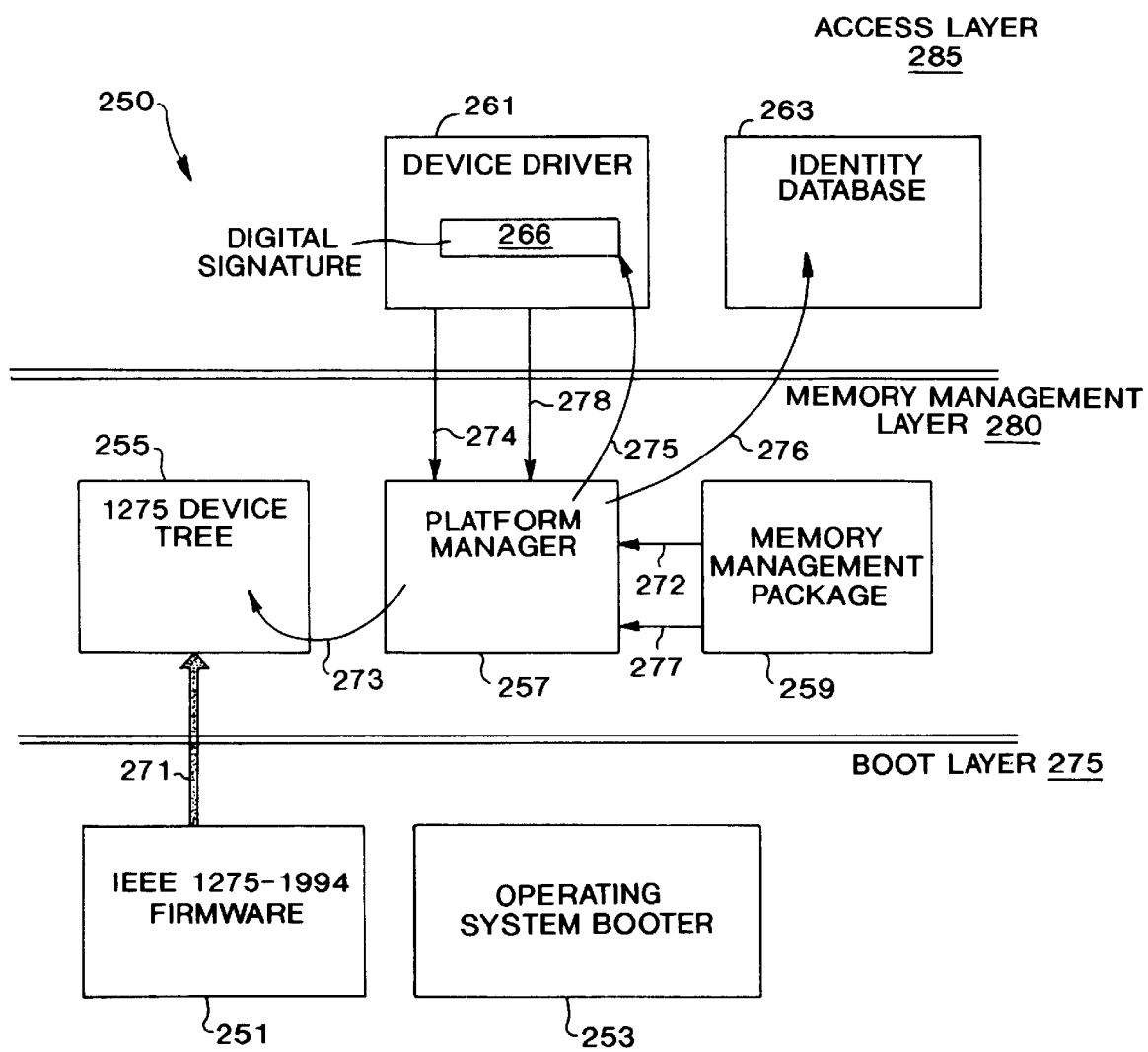
FIG. 3 is a block diagram illustrating a software architecture that may be used to implement the method of FIG. 2.

FIG. 3 is a block diagram illustrating a software architecture 250 that may be used to implement method 200 of FIG. 2. Architecture 250 is made up of three layers of software: a boot layer 275, memory management layer 280 and access layer 285. Boot layer 275 includes IEEE 1275-1994 firmware 251 and operating system booter 253. Firmware 251 is executed to scan the I/O space of the computer system in which it is installed to determine the identity and absolute address of addressable devices in the computer system. Operating system booter 253, which also may be provided in a non-volatile storage device, includes code that is executed to load an operating system into the computer system's memory.

Memory management layer 280 includes a device tree database 255 (designated "1275 device tree" in FIG. 2), a platform manager 257 and a memory management package 259. The identity and absolute address information obtained during execution of firmware 251 is copied to device tree database 255 for later use by platform manager 257. This is indicated by arrow 271. As discussed above, platform manager 257 includes an API that provides procedures that may be called to obtain and activate, respectively, a memory access object. Thus, if during execution of code in memory management package 259, it is necessary to access an absolute address, a procedure call (indicated by arrow 272) is issued to platform manager 257 requesting a memory access object. Based on a passed parameter received in procedure call 272, platform manager 257 examines the 1275 device tree 255 (as indicated by arrow 273) to locate the absolute address. Platform manager 257 then encapsulates the absolute address in a memory object and returns a reference to the object to the calling code within memory management package 259. As stated above, the access methods of the memory access object must be activated before they can be invoked to perform absolute addressing. Thus, code in memory management package 259 is executed to issue procedure call 277 to platform manager 257. After confirming that the calling code is included within trusted memory package 259, the platform manager procedure invoked by call 277 activates the access methods of the memory access object.

Access layer 285 includes a device driver 261 and an identity database 263. When executed device driver 261 issues a procedure call (as indicated by arrow 274) to platform manager 257 requesting a memory access object. As described above, platform manager 257 examines the 1275 device tree to identify a device corresponding to a parameter passed in procedure call 274. Platform manager 257 then builds a memory access object encapsulating an absolute address of the identified device and returns the memory access object to the device driver 261. Another procedure call (indicated by arrow 278) is then issued by device driver 261 requesting activation of the access methods of the memory access object returned in response to procedure call 274. After determining that device driver 261 is not included in a secure operating system package, platform manager 257 inspects a digital signature 266 included within or appended to device driver 261 to determine whether it indicates that the device driver 261 has been signed by a certified entity. The act of inspecting the digital signature 266, as indicated by arrow 275 in FIG. 3, may be implemented, for example, by passing the digital signature or the address of the digital signature to the platform manager 257 in procedure call 278. Platform manager determines whether the device driver 261 has been signed by a certified entity by determining whether the digital signature 266 corresponds to a certificate previously recorded in identity database 263. This operation is indicated by arrow 276 in FIG. 3. A certificate can be recorded in the identity data base by a system administrator or other individual after obtaining the certificate from a certifying authority.

IEEE 1275-1994 Device Tree

Figure 4:
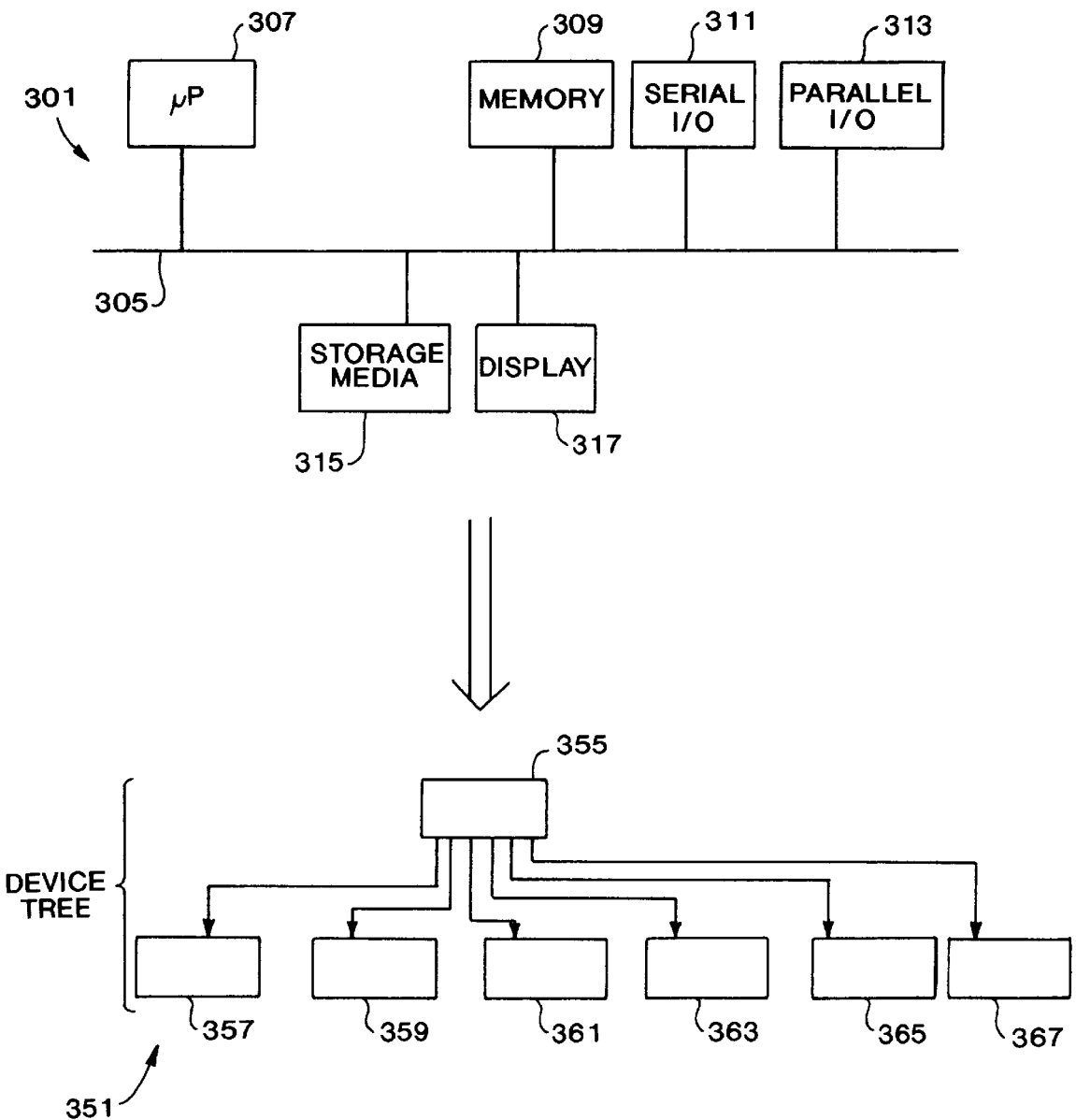
FIG. 4 illustrates the construction of a device tree based on a computer architecture.

FIG. 4 depicts a device tree 351 used to represent a computer architecture 301. As stated above, device tree 351 is a data structure constructed by boot firmware to provide information about the hardware attached to a computer system. "Open Firmware" is the name given to non-proprietary boot firmware that can construct a device tree according to the IEEE 1275-1994 standard for a number of different hardware platforms. For a given hardware platform, each system bus corresponds to an interior node of the device tree and the devices coupled to the system bus are represented by child nodes of the interior node. This way, the structure of the device tree reflects the structure of the underlying hardware. For example, bus 305 of computer system 301 corresponds to interior node 355 of device tree 351, and attached devices 307, 309, 311, 313, 315 and 317 (i.e., microprocessor, memory, serial I/O, parallel I/O, storage media and display, respectively) correspond to child nodes 357, 359, 361, 363, 365 and 367 of interior node 305. It will be appreciated that numerous other devices could be attached to bus 305 and that there may be multiple system buses in a more complex architecture.

According to the IEEE 1275-1994 standard, devices plugged into expansion slots on a computer bus report their characteristics to Open Firmware via a device interface. Open firmware then stores the reported information in a device tree node established for the reporting device. The reported information will typically include the device name, model, revision level, device type, register locations, interrupt levels, supported features and any other information significant to the operation of the reporting device. Device tree nodes are also established for permanently installed devices and the set of information used to describe a particular device can be extended to support new types of devices having new characteristics.

Figure 5:
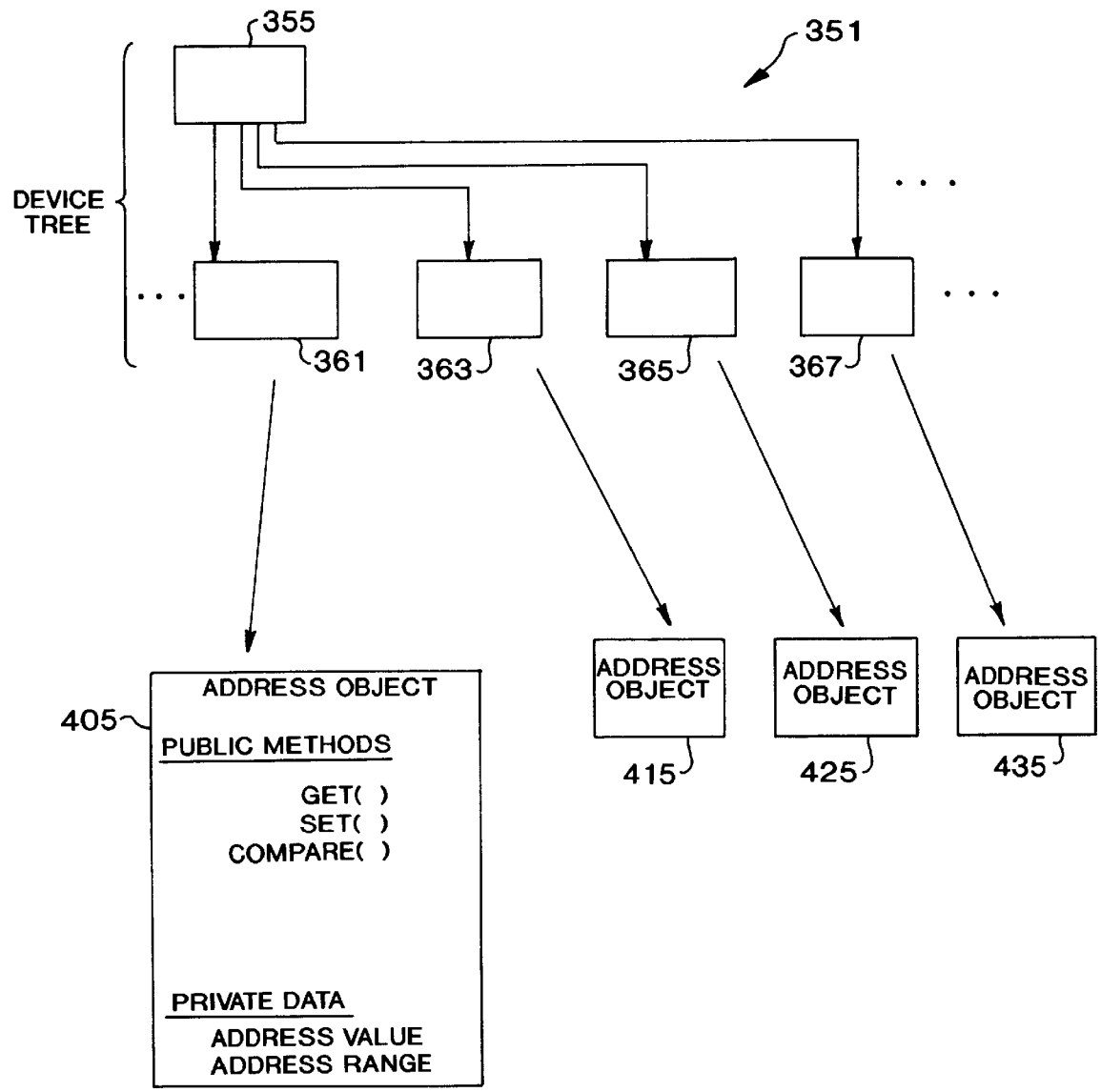
FIG. 5 illustrates the construction of memory access objects based on a device tree.

As FIG. 5 illustrates, absolute addresses stored in the device tree 351 are used in the construction of memory access objects 405, 415, 425 and 435. Open Firmware includes a client interface defined by the IEEE 1275-1994 standard to allow operating systems and other programs to access the device tree. In a preferred embodiment of the present invention, the operating system invokes services provided by the Open Firmware client interface to identify absolute addresses corresponding to attached devices. For each absolute address identified, a memory access object may be instantiated and the absolute address encapsulated in the memory access object.

Methods in each of the memory access objects (405, 415, 425, 435) may be made public or kept private. Public methods can be invoked by any code having access to the memory access object, while private methods can be invoked only by methods of the memory access object itself. Thus, in memory access object 405, methods Get(), Set() and Compare() are made public to allow programs having access to memory access object 405 to read a value from the absolute address encapsulated in memory access object 405, write a value to the absolute address, and compare the absolute address for equality with another absolute address. It will be appreciated that other methods could be added. Memory access object 405 includes private data fields to hold the absolute address value and a length value. Together the absolute address and the length define a range of addresses which can be touched by the methods of the memory access object 405, and the memory access object 405 is said to "wrap" the range of absolute addresses.

The size and format of an absolute address is usually dependent on a processor or bus included in the hardware platform. Even within a single hardware platform, some absolute addresses may be memory mapped while others may be I/O port mapped. Thus, when an operating system including memory access objects according to the present invention is executing on a processor having a 32-bit address width, a memory access object capable of wrapping a range of 32-bit addresses may be used. When executing on a processor having a 64-bit address width, a memory access object capable of wrapping a range of 64-bit addresses is necessary. In a preferred embodiment, an address class tool-kit is provided to allow different sized and formatted absolute addresses to be wrapped in objects. Once a class has been defined it can be referenced by the platform manager of FIG. 3 to build a memory access object.

Device Driver Model According to the Present Invention

Figure 6:
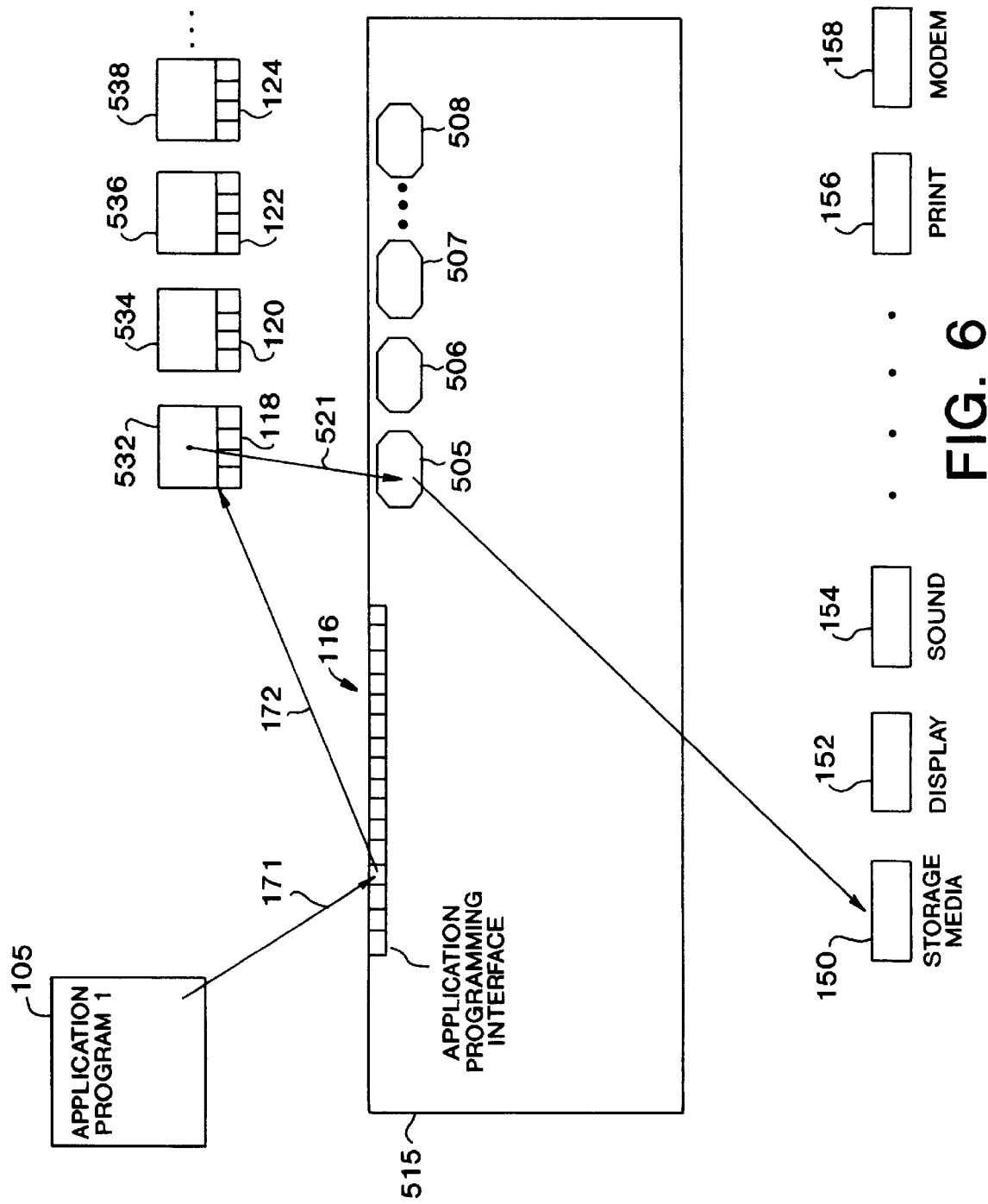
FIG. 6 illustrates a device driver model according to the present invention.

FIG. 6 illustrates a device driver model according to the present invention. Application program 105, operating system 515 and device drivers 532, 534, 536 and 538 are all loaded into system memory. After application program 105 invokes an operating system service provided in the operating system's API 116 to perform device control (as indicated by arrow 171), the operating system identifies the device driver responsible for performing the requested device control operation (in this case device driver 532), then calls a service provided by the device driver interface 118 of device driver 532 as indicated by arrow 172. So far, events have been as described above in reference to the traditional device driver model of FIG. 1. However, instead of accessing the attached hardware device at an absolute address maintained in the device driver 532 code or pointer variables, device driver 532 invokes a method made public in memory access object 505. Depending on the operation originally requested by application program 105, the method of memory access object 505 may write or read the absolute address of a register or data buffer in the controlled device, in this case storage media 150. Registers and buffers within the other attached devices (Display 152, Sound card 154, Print driver 156, Modem 158) can be read and written in a similar fashion by invoking methods in other operating system memory access objects (506, 507, 508).

As mentioned briefly above, in addition to allowing device drivers to be written without requiring pointers to absolute addresses, the present invention allows software controlled bounds checking of absolute addresses before they are asserted. This is significant because the granularity of bounds checking performed by memory access object methods can be much finer than that achieved in hardware. For example, the memory management unit (MMU) of Motorola™ 680x0 processors can be used to define pages as small as 4 kilobytes (kb) and to cause an exception if an access outside the page boundary is detected. Motorola is a trademark of Motorola, Inc. However, in the context of a computer's I/O space where legal ranges of one or two bytes are common, 4 kb is often much too coarse for meaningful bounds checking. On the other hand, when get/set methods of a memory access object are invoked, the access is limited by object definition to an address in the precise range specified by the absolute address and length data wrapped by the object. This makes bounds checking possible to the granularity of a single address value.

Another advantage of forcing absolute addressing to be performed by invocation of memory access object methods is that other time-consuming hardware protection mechanisms can be avoided. For example, Motorola 680x0 processors must often be switched between user and supervisor modes based on the range of memory access required. In the traditional device driver model, device drivers are executed in supervisor mode in order to have access to the system I/O space. Application programs, on the other hand, are executed in user mode to ensure that application program bugs do not inadvertently corrupt data at critical I/O space addresses. While switching between user and supervisor modes provides a level of security, it slows program execution and adds complexity to the programming environment.

In the device driver model according to the present invention, there is no need for the device driver programmer to specify addresses in the system I/O space. In fact, when application programs and device drivers are written in a secure programming language like Java, programmers cannot point and write to the I/O space at all. Consequently, when used to support Java-coded application programs and device drivers, the device driver model of the present invention may safely be executed in 680x0 supervisor mode at all times, thereby simplifying the system programming model and avoiding the execution overhead required for mode switching.

Computer System Overview

Figure 7:
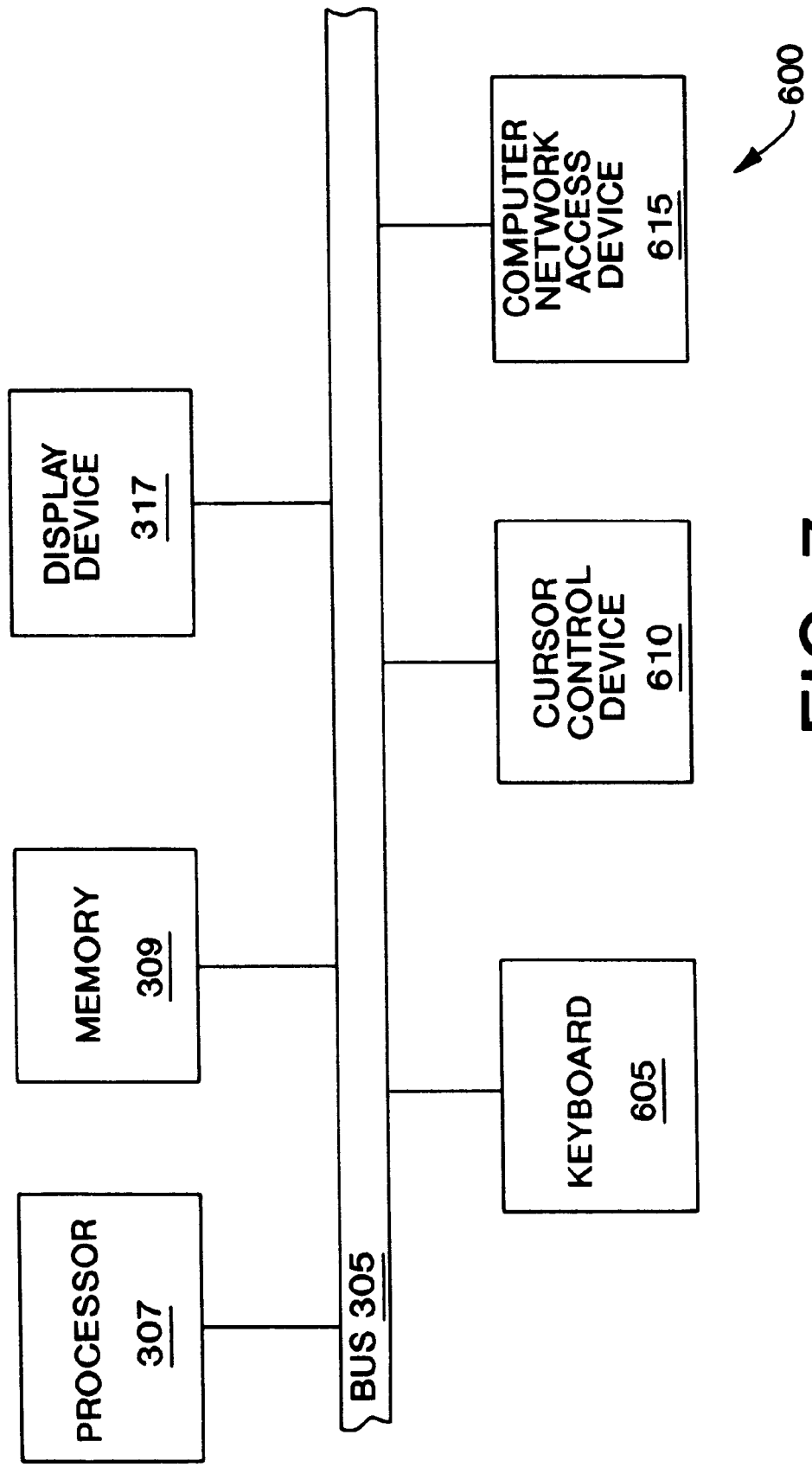
FIG. 7 depicts a computer architecture that can be used to perform the method of the present invention.

FIG. 7 depicts a block diagram of a general purpose computer system 600 for performing the individual steps of the method of the present invention. The computer system 600 includes a processor 307, memory 309, display device 317, keyboard 605, cursor control device 610, and computer network access device 615 each coupled to a bus 305. Bus 305 typically includes an address bus, data bus and control bus (not shown). Cursor control device 610 may be a mouse, trackball, pen or any other device for manipulating a cursor on display 317. Both the cursor control device 610 and the keyboard 605 enable the computer system 600 to receive input from a computer-user. Network access device 615 may be a modem, network adapter card or any other device for coupling computer 600 to a computer network.

Memory 309 may include both system memory (e.g., random access memory) and non-volatile storage such as a semiconductor read-only-memory, hard disk-drive, floppy disk-drive, optical disk-drive or any other computer-readable medium. When power is applied to the computer system 600, program code defining an operating system is loaded from non-volatile storage into system memory by processor 307 or another device, such as a direct memory access controller (not shown), having access to memory 309. Sequences of instructions comprised by the operating system are then executed by processor 307 to load other computer programs and portions of computer programs into system memory from non-volatile storage. The present invention may be embodied in a sequence of instructions which can be stored in a computer-readable medium and executed by processor 307. It will be appreciated that both system memory and non-volatile storage may be used to effectuate a virtual memory. In that case, sequences of instructions defining a portion of the operating system or an application program may be kept in non-volatile storage and then moved to system memory when required for execution.

It should be noted that the individual method steps of the present invention may be performed by a general purpose processor programmed with instructions that cause the processor to perform the recited steps described in reference to FIG. 2 above, specific hardware components that contain hard-wired logic for performing the recited steps, or any combination of programmed general purpose computer components and custom hardware components may also be used. Nothing disclosed herein should be construed as limiting the present invention to a single embodiment wherein the recited steps are performed by a specific combination of hardware components.

A method for secure device addressing is thus described. While the present invention has been described in particular embodiments and through particular examples, the present invention should not be construed as limited by such embodiments and examples, but rather construed according to the following claims.

What is claimed is:

1. A method for securely addressing a peripheral device at an absolute address comprising the computer-implemented steps of:

executing a first computer program to request a memory access object from an operating system, the memory access object including a procedure executable to address the peripheral device at the absolute address;

executing a first operating system procedure to provide the memory access object to the first computer program if a value associated with the first computer program indicates that the first computer program is trusted to perform absolute addressing; and executing the first computer program to invoke the memory access object procedure to address the peripheral device at the absolute address.

2. The method of claim 1 wherein said step of executing a first operating system procedure to provide the memory access object to the first computer program if a value associated with the first computer program indicates that the first computer program is trusted comprises the step of determining that a digital signature associated with the first computer program indicates that the first computer program has been signed by a certified entity.

3. The method of claim 2 wherein said step of determining that a digital signature associated with the first computer program indicates that the first computer program has been signed by certified entity comprises the step of determining that the digital signature corresponds to a certificate in an identity database, the certificate having been previously obtained from a certifying authority.

4. The method of claim 1 wherein said step of executing a first computer program to request a memory access object comprises the step of executing the first computer program to request a memory access object that maps the peripheral device.

5. The method of claim 4 further comprising the step of executing a second operating system procedure to build the memory access object including the procedure executable to address the peripheral device at the absolute address.

6. The method of claim 5 wherein said step of executing a second operating system procedure to build the memory access object comprises the step of passing to the second operating system procedure a parameter indicating the peripheral device to be mapped by the memory access object.

7. The method of claim 5 wherein said step of executing a second operating system procedure to build the memory access object comprises the step of examining a database of absolute addresses to find an absolute address corresponding to a parameter passed to the second operating system procedure by the first computer program.

8. The method of claim 5 wherein said step of executing a second operating system procedure to build the memory access object comprises the step of instantiating a data object based on a pre-defined object class.

9. The method of claim 1 wherein said step of executing a first operating system procedure to provide the memory access object to the first computer program comprises the step of returning a reference to the memory access object to the first computer program.

10. The method of claim 1 wherein said step of executing a first operating system to provide the memory access object comprises the step of providing the first memory access object to the first computer program if the value associated with the first computer program indicates that the first computer program is a sequence of program code included in a secure collection of object classes.

11. The method of claim 10 wherein the secure collection of object classes is a Java package.

12. The method of claim 1 wherein the first computer program is a device driver.

13. The method of claim 1 further comprising the step of downloading the first computer program from a computer network.

14. An article of manufacture including one or more computer-readable media having stored thereon sequences of instructions which, when executed by a processor, cause said processor to securely address a peripheral device at an absolute address by performing the steps of:

executing a first computer program to request a memory access object from an operating system, the memory access object including a procedure executable to address the peripheral device at the absolute address;

executing a first operating system procedure to provide the memory access object to the first computer program if a value associated with the first computer program indicates that the first computer program is trusted to perform absolute addressing; and executing the first computer program to invoke the memory access object procedure to address the peripheral device at the absolute address.

15. The article of claim 14 wherein said step of executing a first operating system procedure to provide the memory access object to the first computer program if a value associated with the first computer program indicates that the first computer program is trusted comprises the step of determining that a digital signature associated with the first computer program indicates that the first computer program has been signed by a certified entity.

16. The article of claim 14 wherein said sequences of instructions include instructions which, when executed by said processor, cause said processor to perform the step of executing a second operating system procedure to build the memory access object including the procedure executable to address the peripheral device at the absolute address.

17. The article of claim 16 wherein said step of executing a second operating system procedure to build the memory access object comprises the step of examining a database of absolute addresses to find an absolute address corresponding to a parameter passed to the second operating system procedure by the first computer program.

18. A computer data signal embodied in a carrier wave and representing sequences of instructions which, when executed by a processor, cause said processor to securely address a peripheral device at an absolute address by performing the steps of:

executing a first computer program to request a memory access object from an operating system, the memory access object including a procedure executable to address the peripheral device at the absolute address;

executing a first operating system procedure to provide the memory access object to the first computer program if a value associated with the first computer program indicates that the first computer program is trusted to perform absolute addressing; and executing the first computer program to invoke the memory access object procedure to address the peripheral device at the absolute address.

19. The computer data signal of claim 18 wherein said step of executing a first operating system procedure to provide the memory access object to the first computer program if a value associated with the first computer program indicates that the first computer program is trusted comprises the step of determining that a digital signature associated with the first computer program indicates that the first computer program has been signed by a certified entity.

20. A computer system comprising:

a bus;

a processor coupled to said bus;

a peripheral device coupled to said bus; and a memory coupled to said bus; said memory having stored therein sequences of instructions which, when executed by said processor, cause said processor to securely address said peripheral device at an absolute address by performing the steps of:

executing a first computer program to request a memory access object from an operating system, the memory access object including a procedure executable to address said peripheral device at the absolute address;

executing a first operating system procedure to provide the memory access object to the first computer program if a value associated with the first computer program indicates that the first computer program is trusted to perform absolute addressing; and executing the first computer program to invoke the memory access object procedure to address said peripheral device at the absolute address.

21. The method of claim 1 wherein said step of executing a first computer program to request a memory access object comprises the step of executing the first computer program on either a first hardware platform or a second hardware platform, the second hardware platform being different from the first hardware platform.

* * * * *